(12) United States Patent
Schaeffer (10) Patent No.: US 8,813,421 B2
(45) Date of Patent: *Aug. 26, 2014

(54) TRELLISING CROSS ARM

(71) Applicant: George M. Schaeffer, Henderson, NV (US)

(72) Inventor: George M. Schaeffer, Henderson, NV (US)

(73) Assignee: George M. Schaeffer, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,977

(22) Filed: Mar. 20, 2013

(65) Prior Publication Data

US 2013/0212938 A1 Aug. 22, 2013

Related U.S. Application Data

(62) Division of application No. 12/974,604, filed on Dec. 21, 2010, now Pat. No. 8,424,241.

(60) Provisional application No. 61/284,804, filed on Dec. 24, 2009.

(51) Int. Cl.
*A01G 17/04* (2006.01)
*A01G 17/06* (2006.01)

(52) U.S. Cl.
CPC ............... *A01G 17/04* (2013.01); *A01G 17/06* (2013.01)
USPC .................................. 47/46; 47/44

(58) Field of Classification Search
USPC .......... 47/42–47; 256/47–49, 52; 248/220.21, 248/220.31, 224.8, 225.21, 156, 152, 47, 248/48, 49, 125.2, 207, 218.4, 219.1, 219.3, 248/221.11, 222.11, 221.12, 223.51, 227

IPC .............................................. A01G 17/04, 17/08
See application file for complete search history.

(56) References Cited

U.S. PATENT DOCUMENTS

| | | | | | |
|---|---|---|---|---|---|
| 2,227,553 | A | * | 1/1941 | Paque | 52/153 |
| 3,163,911 | A | * | 1/1965 | Kenney | 249/41 |
| 3,177,988 | A | * | 4/1965 | Costantini et al. | 403/387 |
| 3,807,089 | A | * | 4/1974 | Senese | 47/46 |
| 3,858,996 | A | * | 1/1975 | Jarvis | 403/353 |
| 4,134,564 | A | * | 1/1979 | Hanna | 248/243 |
| 4,566,819 | A | * | 1/1986 | Johnston | 403/385 |
| 4,971,281 | A | * | 11/1990 | Steinbeck | 248/222.13 |
| 4,976,357 | A | * | 12/1990 | Pearson | 211/85.1 |
| 5,438,795 | A | * | 8/1995 | Galbraith | 47/46 |

(Continued)

FOREIGN PATENT DOCUMENTS

FR 2670081 A3 * 6/1992 ............. A01G 17/06

*Primary Examiner* — Shadi Baniani
(74) *Attorney, Agent, or Firm* — Brian J. Riddle; Van Cott, Bagley, Cornwall & McCarthy P.C.

(57) ABSTRACT

A trellis support system comprises a vertical post comprising a front portion and first and second opposing side wall portions, the front portion comprising an aperture, the aperture comprising a first portion and a second portion adjacent the first portion, and a horizontal cross arm perpendicular to the vertical post comprising a front portion and first and second opposing side wall portions dimensioned to match the front and side wall portions of the post, the front portion comprising a tab member dimensioned to engage the first portion of the aperture and a lock member positioned adjacent the tab member and dimensioned to engage the second portion of the aperture.

19 Claims, 5 Drawing Sheets

(56) References Cited

U.S. PATENT DOCUMENTS

| | | | |
|---|---|---|---|
| 5,966,867 A * | 10/1999 | Downer et al. | 47/46 |
| 6,325,347 B1 * | 12/2001 | Crichton | 248/228.1 |
| 7,070,021 B1 * | 7/2006 | McKinney | 182/92 |
| 7,207,542 B2 * | 4/2007 | Conway et al. | 248/458 |
| 7,837,165 B2 * | 11/2010 | Stone | 248/224.51 |
| 2004/0026678 A1 * | 2/2004 | Vandergriff | 256/47 |

* cited by examiner

TRELLISING CROSS ARM

RELATED APPLICATIONS

The present application is a divisional application and claims priority under 35 U.S.C. §121 of U.S. patent application Ser. No. 12/974,604, (now allowed) filed Dec. 21, 2010, by George M. Schaeffer, entitled "Trellising Cross Arm," which application is incorporated herein by reference in its entirety. U.S. patent application Ser. No. 12/974,604 claims priority under 35 U.S.C. §119(e) to U.S. Provisional Application, Ser. No. 61/284,804, filed Dec. 24, 2009, the entirety of which is incorporated herein by reference.

TECHNICAL FIELD

The present system relates to trellising cross arm assemblies and, more particularly, trellising, cross arm assemblies for use in trellising grapes, berries, olives, coffee beans and the like for agricultural or vineyard applications.

BACKGROUND

It is common practice in vineyards or related agricultural settings to provide a plant-supporting system, sometimes referred to as a trellis, comprising rows of roll-formed steel vertical posts and a number of horizontal cross arms for supporting rows of wires in parallel fashion upon which the agricultural products are trained. Traditional cross arms are fastened to the vertical posts by U-bolts, nuts, washers, or other external hardware. In some cases, the cross arms may be individually welded to the posts. The installation process for attaching the cross arms to the posts is expensive, both from a cost perspective of having to supply separate fastening devices, hardware and tools, as well as the associated time it takes to attach the cross arms to the vertical posts using these fastening methods.

SUMMARY

A trellis support system comprises a vertical post comprising a front portion and first and second opposing side wall portions, the front portion comprising an aperture, the aperture comprising a first portion and a second portion adjacent the first portion, and a horizontal cross arm perpendicular to the vertical post comprising a front portion and first and second opposing side wall portions dimensioned to match the front and side wall portions of the post, the front portion comprising a tab member dimensioned to engage the first portion of the aperture and a lock member positioned adjacent the tab member and dimensioned to engage the second portion of the aperture.

DETAILED DESCRIPTION

Generally, the present system overcomes the above drawbacks by providing a horizontal cross arm comprising a snap-in tab mechanism formed in the cross arm that mates with a number of apertures defined in the post, securely attaching the horizontal cross arm to the post, quickly and efficiently, without the need for separate fastening devices, hardware, or tools. Not only does the present system provide a means of constructing a trellis system faster and more efficiently than other systems, but also it provides an added benefit of reducing the chance of lost nuts, bolts, washers, or other small hardware being ingested into expensive harvesting and processing equipment during harvesting and/or in down-stream processes.

Figure 1:
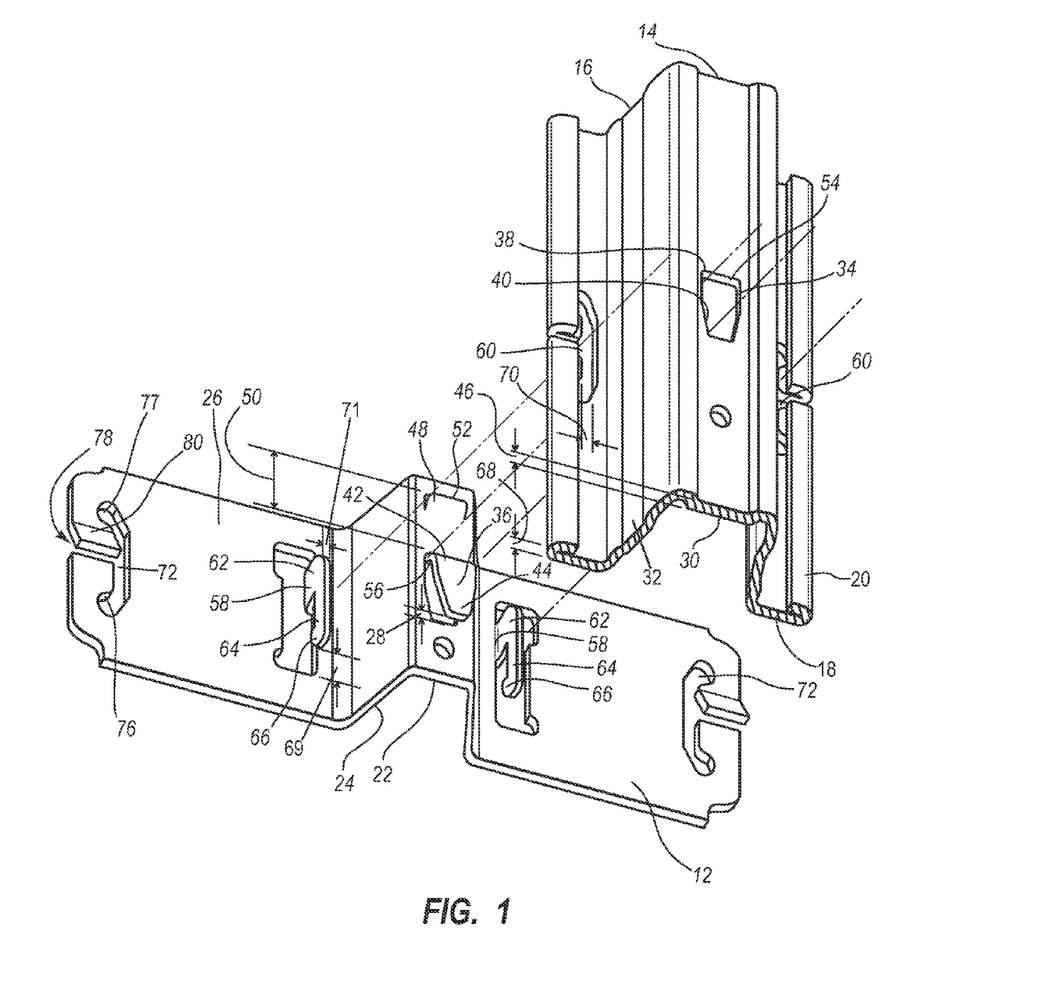
FIG. 1 is an exploded view of one embodiment of the trellis system, according to one embodiment of principles described herein.
Figure 2:
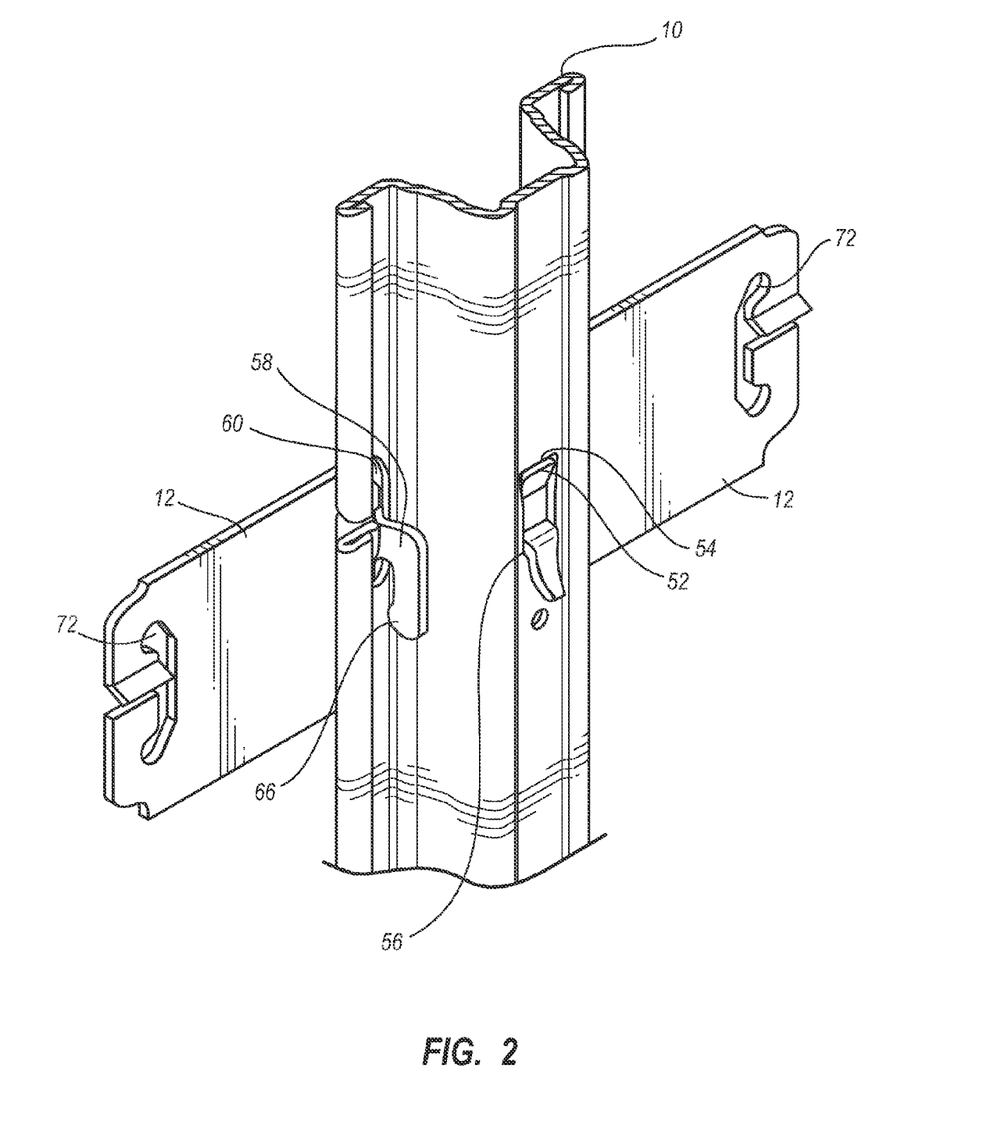
FIG. 2 is a perspective view of the embodiment shown in FIG. 1 when coupled together, according to one embodiment of principles described herein.

The present system (100) comprises a number of vertical roll-formed steel posts and a number of horizontal cross arms which are used in vineyards, orchards, berry farms, and in other agricultural growing applications in which plant support is utilized. Referring to FIGS. 1 and 2, the system (100) includes, in one embodiment, rows of a number of vertical posts (10) with a number of horizontal cross arms (12) attached to each vertical post (10). The vertical posts (10) include a generally U-shaped cross section along its length comprising a front portion (14), a pair of opposing side portions (16), and a pair of rear portions (18) that each terminate with an overturned curved flange portion referred to in the art as returns (20). The returns (20) strengthen the vertical posts (10) and prevent premature wear of harvester beater bars.

The cross arm (12) also includes a generally U-shaped portion that is configured to match and nest within the U-shaped cross section of the vertical post (10). More specifically, the cross arm (12) includes a front portion (22), a pair of opposing side portions (24), and a pair of rear portions (26) that each extend outwardly from the opposing side portions (24) at varying lengths. In a similar manner as described above in connection with the returns (20) of the vertical posts (10), the horizontal cross arms (12) may comprise perimeter strengthening ridges that strengthen the horizontal cross arms (12).

In one embodiment, the vertical post (10) includes coining portions along its length configured to contact corresponding portions of the cross arm (12). The coining portions include a front coining (30) and opposing side coinings (32). The coinings (30, 32) add to the strength of the vertical posts 10. The coining portions (30, 32) are also sized such that when the front portion (22) of the cross arm (12) is positioned against the underside of the front portion (14) of the vertical post (10) (i.e., against the inside of the "U"), the front (22) and side (24) portions of the cross arm (12) abut with the coinings coinciding with the corresponding front (14) and side (16) portions of the vertical post (10). Further, in one embodiment, the opposing side coinings (32) are sized such that the opposing side walls (16) of the vertical post (10) are abutted tightly against the respective front portions (14) and (22) to make contact, thereby contributing to the overall integrity and strength of the vertical post (10) and cross arm (12) combination when assembled and locked as described below.

The vertical post (10) and cross arm (12) are mated together using a series of tabs on the cross arm (12) and corresponding apertures on the vertical post (10) configured to receive the tabs such that the horizontal cross arm (12) securely locks onto the vertical post (10). More specifically, in one embodiment, the vertical post (10) has a number of central apertures (34) defined in the front portion (14) configured to receive a number of corresponding central tab members (36) positioned on the front portion (22) of the cross arm (12). The central aperture (34) and central tab member (36) are formed in the vertical post (10) by punching, stamping, cutting, or combinations thereof. In one embodiment, the central aperture (34) has a generally square or rectangular shape at a first end (38), which becomes slightly trapezoidal near a second end (40) of the aperture. The corresponding central tab member (36) is similar in shape, comprising a generally square or rectangular shape at a first end (42) and a slightly trapezoidal shape at a second end (44). The central tab member (36) has an underside that is separated from the front portion (22) of the cross arm. In one embodiment, a standoff distance (28) is created that is approximately equal to the thickness (46) of the front portion (14) of the vertical post (10) such that a secure and tight fit is created between the central tab member (36) and the front portion (14) of the vertical post (10). Configuring the standoff distance (28) to be slightly less than the thickness (46) of the front portion (14) of the vertical post (10) provides an extremely tight fit when the vertical post (10) and cross arm (12) are positioned together and secured by the central tab member (36) and aperture (34) combination. A stop member (48) is offset a distance 50 from the position where the tab member 36 connects with the cross arm (12). The stop member (48) includes an upending tip portion (52) that is sized and configured to abut and lock against a corresponding rear side wall (54) at the first end (38) of the central aperture (34).

With the central tab member (36) and stop member (48) sized and configured with respect to the corresponding central aperture (34), as described above, the trapezoidal shaped second end (44) of the central tab member (36) may be inserted into the rectangular shaped first end (38) of the central aperture (34) and urged toward the second end (40) until the stop member (48) is pressed into the central aperture (34) and the upending tip portion (52) abuts and locks against the rear side wall (54). At the same time the upending tip portion (52) abuts and locks against the rear side wall (54), a rear underside portion 56 of the central tab member (36) abuts corresponding wall sections of the trapezoidal shaped second end (40) of the central aperture (34). The dual locking and abutting aspects of the tab and aperture combination just described, together with the tight fit provided by the underside of the front 14 and opposing side 22 provide an extremely tight fit between the vertical post (10) and cross arm (12).

While the embodiment above described is sufficient to lock the vertical post (10) and cross arm (12) together for certain purposes, the use of additional side-positioned tab and aperture combinations further increases the strength and integrity of the combination. Referring still to FIGS. 1 and 2, side positioned tab and aperture combinations include a side tab member (58) and a side aperture (60) (only one side requires description due to symmetry). More specifically, in one embodiment, the vertical post (10) has aside aperture (60) positioned at the rear portion (18) configured to receive a corresponding side tab member (58) positioned on the rear portion (26) of the cross arm (12). In one embodiment, the side aperture (60) has a generally longitudinally rectangular shape comprising a width (70). The corresponding side tab member (58) extends upwardly from the rear portion (26) of the cross arm (12) and includes a first portion (62) attached to the cross arm (12) and a second portion (64) that extends in a longitudinal direction parallel to the opposing side walls (24) of the cross arm (12). The side tab members (58) are formed the horizontal cross arm (12) by punching, stamping, cutting, or combinations thereof. The side tab member (58) has a thickness (71) that is approximately equal to the width (70) of the side aperture (60). A tip portion (66) is positioned at the distal end of the second portion (64). The tip portion (66) of the side tab member (58) has an underside that is separated from the surface of the rear portion (26) of the cross arm (12) a standoff distance (69) that is approximately equal to the thickness (68) of the rear portion (18) of the vertical post (10). Configuring the thickness (71) of the side tab member (58) to be approximately equal to the width (70) of the side aperture (60) and the standoff distance (69) to be slightly less than the thickness (68) of the rear portion (18) of the vertical post (10) provides an extremely tight fit when the vertical post (10) and cross arm (12) are positioned together and secured, both as described above with respect to the central tab member (36) and central aperture (34) combination, hut also with respect to the side tab member (58) and side aperture (60) combination.

With the side tab member (58) and corresponding side aperture (60) sized and configured as described above, the cross arm (12) is locked with the vertical post (10) in a similar fashion as described above. The trapezoidal shaped second end (44) of the central tab member (36) is inserted into the rectangular shaped first end (38) of the central aperture (34) and urged toward the second end (40) until the stop member (48) is pressed into the central aperture (34) and the upending tip portion (52) abuts and locks against the rear side wall (54). Simultaneously, the second ends (64) of the pair of side tab members (58) are inserted into corresponding ones of the pair of rectangular shaped side apertures (60) and urged in the same direction as the central tab member (36). At the same time the upending tip portion (52) abuts and locks against the rear side wall (54) and the rear underside portion (56) of the central tab member (36) abuts corresponding wall sections of the trapezoidal shaped second end (40) of the central aperture (34), the tip portions (64) of the side tab members (58) will abut corresponding surfaces of the rear portions (18) of the vertical post (10) and the sides of the side tab members (58) will abut corresponding sides of the rectangular shaped side apertures (60). The dual locking and abutting aspects of the central and side tabs and apertures combination just described, together with the tight fit provided by the underside of the front (14) and opposing sides (22) of the vertical post (10) provide an extremely tight fit between the vertical post (10) and cross arm (12). Further, the combination just described—i.e., the combination of using both central and side tab members and apertures—provides the added advantage of increased strength and increased ability to resist torsional loads generated by unbalanced weighting on opposing ends of the cross arms.

Figure 5:
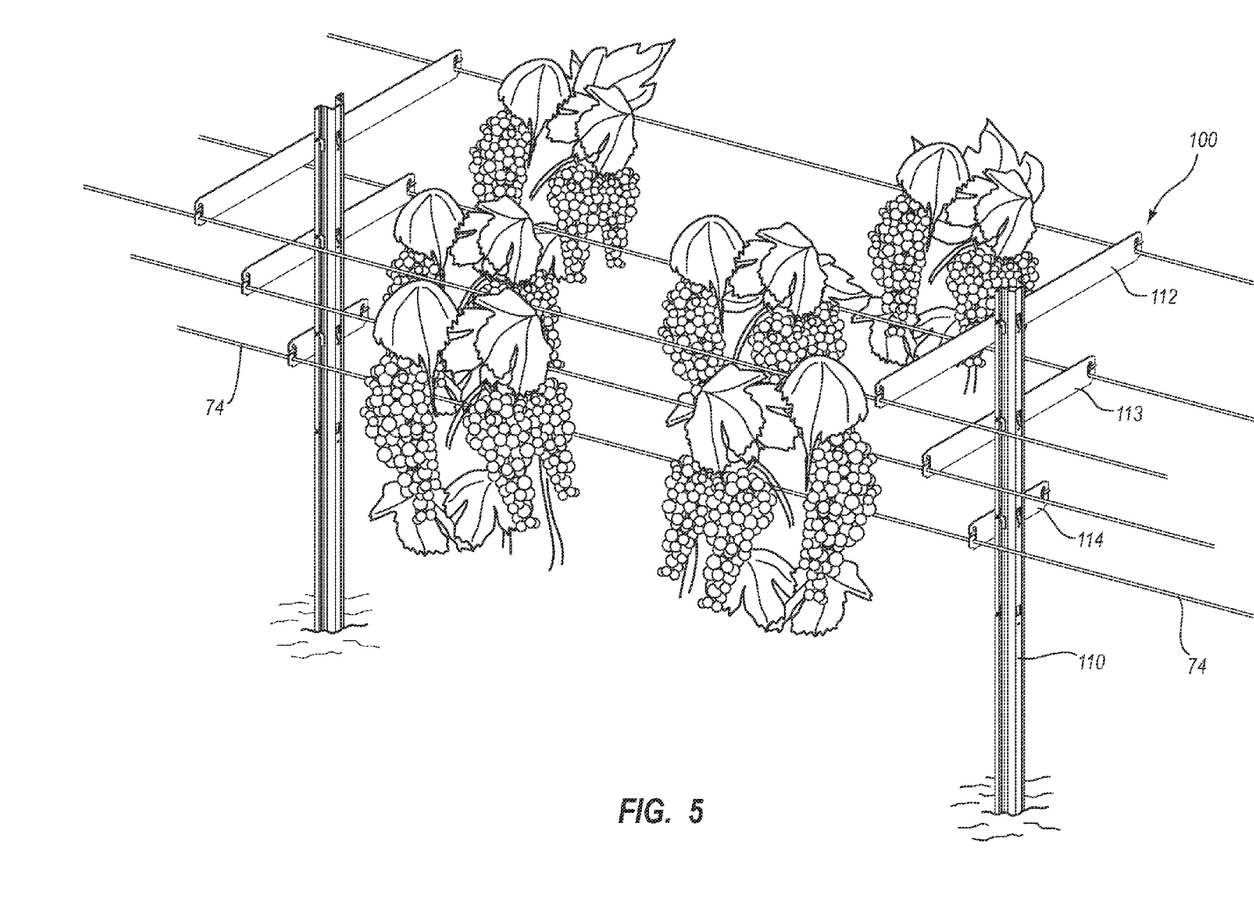
FIG. 5 is a perspective view of an embodiment of the trellis system in use to support a crop of grapes, according to one embodiment of principles described herein.

Still referring to FIGS. 1 and 2 and also 5, the cross arm (12) includes at least a pair of wire slots (72) for carrying wires (74). In an embodiment, the wire slots (72) may be formed at various points on the cross arm (12). For example, the wire slots (72) may be located on any portion of the perimeter of the rear portion (26) of the cross anti (12) including the sides, the top, the bottom, or combinations thereof. Each of the slots (72) includes upper (77) and lower (76) carrying portions for maintaining the wire (74) in place. A flanged opening (78) includes an upturned flange portion (80) that creates an opening for insertion of the wire (74) into the slot (72), after which the wire (74) occupies the upper (77) or lower (76) carrying portions. The upturned flange portion (80) also prevents the wire (74) from sliding out of the slot (72) if pushed upward by some disturbance to the wire (74) such as may occur during the harvesting of the plants or crops.

On the other hand, the wire (74) can be removed when desired by bending the wire (74) slightly to be slid past the upturned flange portion (80).

Figure 3:
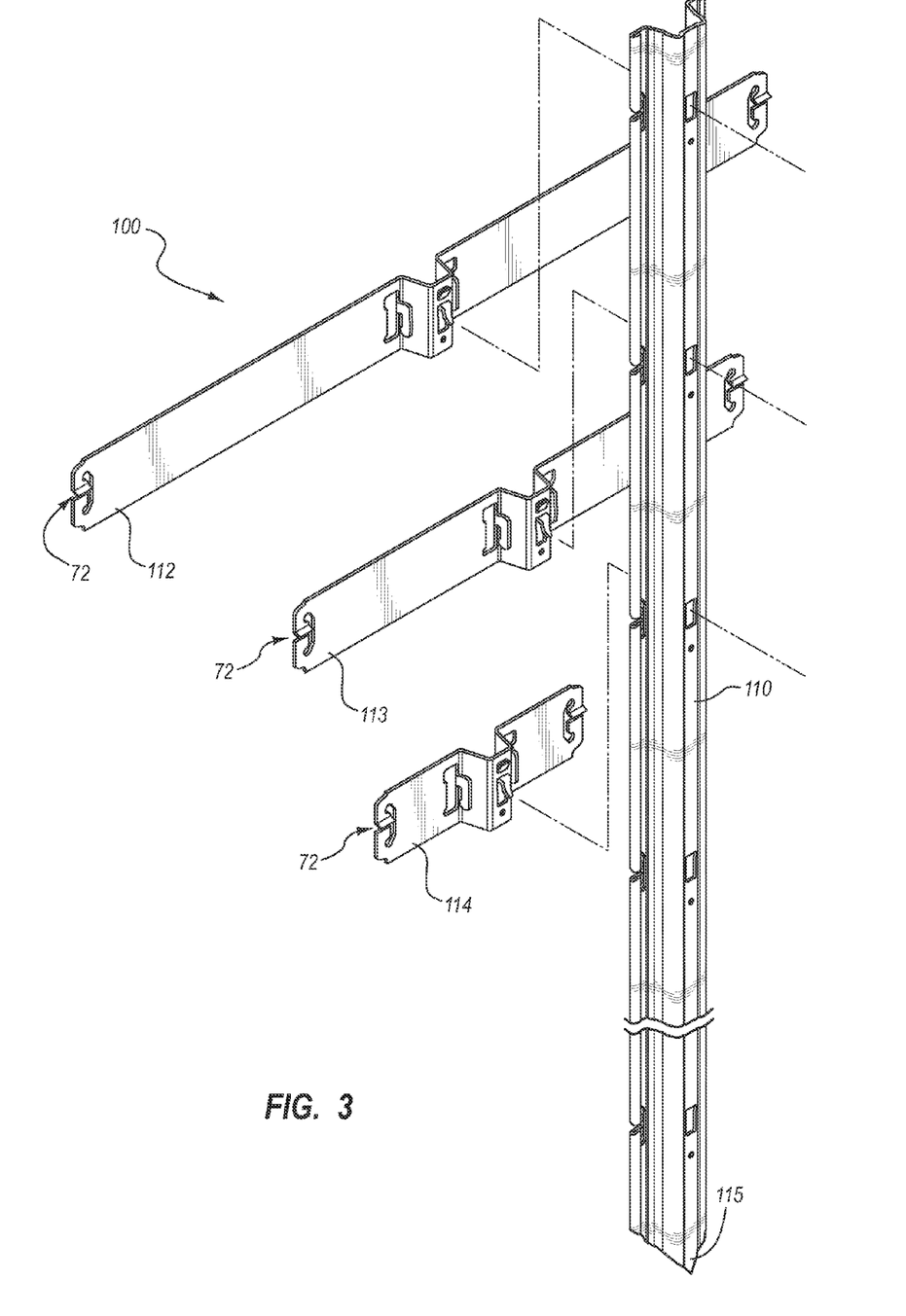
FIG. 3 is an exploded view of a further embodiment of the trellis system, according to one embodiment of principles described herein.
Figure 4:
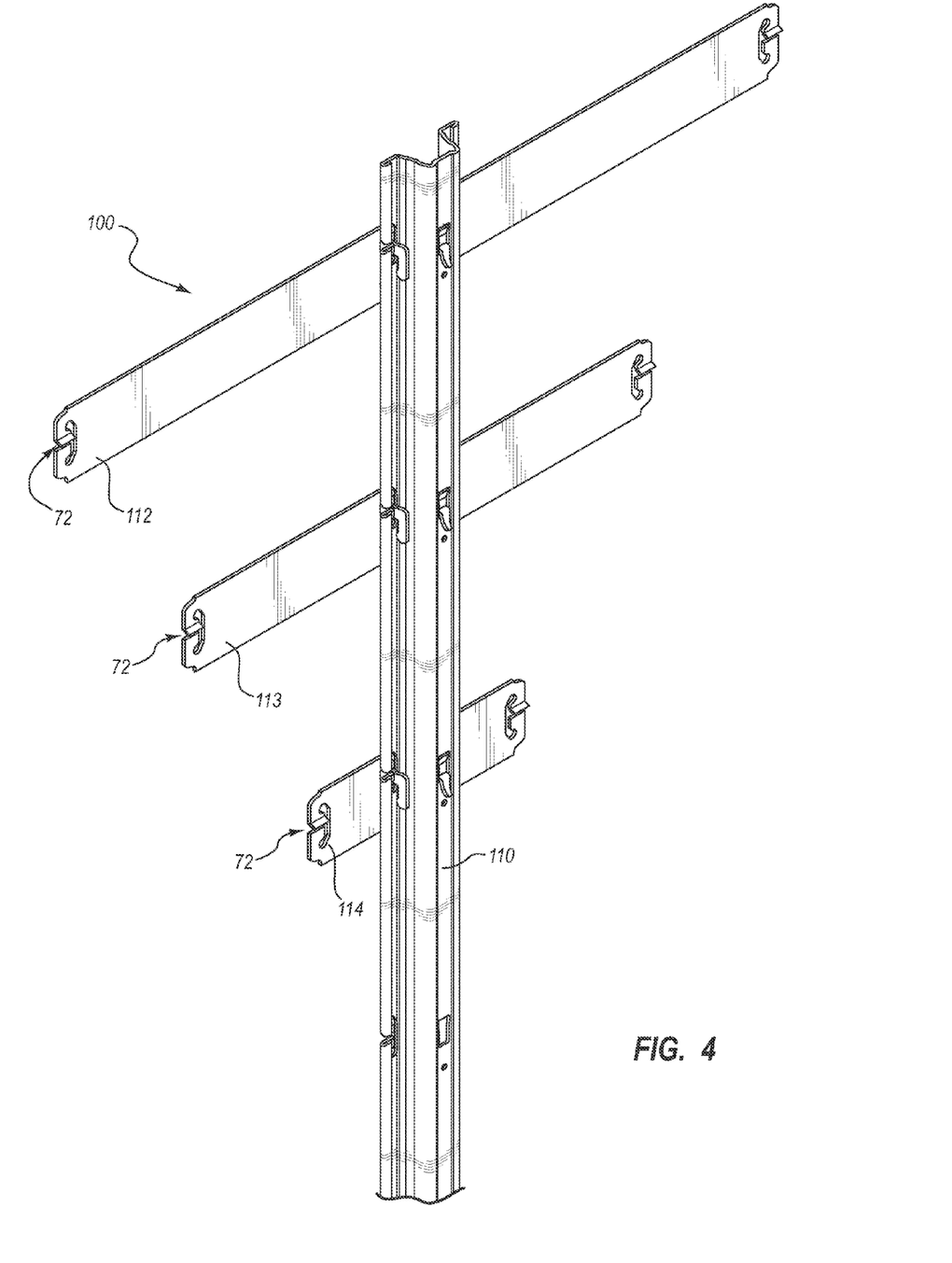
FIG. 4 is a perspective view of the embodiment shown in FIG. 2 when coupled together, according to one embodiment of principles described herein.

Referring now to FIGS. 3-5, the trellis system (100) is disclosed. The trellis system (100) includes a vertical post (110) and one or more cross arms (112) constructed as described above. In one embodiment, the trellis system (100) includes a series of cross arms (112, 113, 114). The series of cross arms (112, 113, 114) have lengths that may vary according to their positioning on the vertical post (110). For example, the lengths vary in one embodiment such that the lowermost cross arm (114) has the shortest length and the upper most cross arm (112) has the longest length.

The trellis system (100) is erected in traditional fashion, augmented as described above and below. Specifically, the vertical post (110) is driven into the ground. A series of cross arms (112, 113, 114) are then positioned on the vertical post (110) as described above. Further, as described above, the horizontal cross arms are then snapped into or otherwise attached to the vertical posts 110. Finally, a series of wires (74) are incorporated into the system (100) by inserting each wire (74) into a corresponding slot (72) on the cross arms (112, 113, 114). After the series of wires (74) are incorporated into the system (100), the wires (74) are anchored to the ground. The wires (74) are anchored to the ground at the ends of rows of crops either directly or to an intermediary endpost. In this manner, the wires (74) positioned as above described support grapes or other crops for proper growth, ripening, and ease of harvesting.

The various components of the above described system—e.g., the vertical post (10, 110) and cross arms (12, 112, 113, 114)—may be constructed using any suitable material comprising sufficient strength to maintain the integrity of the connection between the vertical post (10, 110) and cross arm (12, 112, 113, 114) and to support the crops during growth and harvesting. The components are constructed using high strength steel, which affords sufficient strength to accomplish the cited requirements and, further, allows springback to permit the cross arms (12, 112, 113, 114) to be secured to the vertical posts (10, 110) as described above. While high strength steel is the material for fabrication, those skilled in the art will appreciate that other materials—e.g., other metals and metal alloys, plastics, polymers, fiberglass, carbon fiber reinforced plastics, resins, or combinations thereof—may be used for such manufacture. In one embodiment, the vertical posts (10. 110) are made of 11 to 14 gauge, roll-formed steel. In another embodiment, the vertical posts (10. 110) are made of 12 or 13 gauge, roll-formed steel. In another embodiment, the cross arms (12, 112, 113, 114) are made of 12 to 16 gauge steel. In yet another embodiment, the cross arms (12, 112, 113, 114) are made of 13 gauge steel. Further, in another embodiment, the vertical posts (10, 110) and horizontal cross arms (12, 112, 113, 114) are made of coated steel or uncoated steel. Further, the various components of the trellis system (100) may be formed by roll-forming, punching, stamping, cutting, or other forms of metal working.

The foregoing description of various embodiments of the present system has been presented for purposes of illustration and description. It is not intended to be exhaustive or to limit the present system to the precise form disclosed, and many modifications and variations are possible in light of the above teaching without deviating from the spirit and the scope of the present system. The embodiments described are selected to best explain the principles of the present system and its practical application to thereby enable others skilled in the art to best utilize the present system in various embodiments and with various modifications as suited to the particular purpose contemplated. It is intended that the scope of the present system be defined by the claims appended hereto.

What is claimed is:

1. A trellis support system, comprising:
   a vertical post comprising:
     a post front portion;
     a first post side wall adjacent to the post front portion;
     a second post side wall opposing the first post sidewall, and
     a number of post rear portions extending from the first and second post side walls, the post rear portions defining a number of rear portion apertures;
   in which the post front portion defines a post front aperture, the post front aperture comprising a first aperture portion and a second aperture portion adjacent the first aperture portion; and
   a horizontal cross arm perpendicular to the vertical post comprising:
     a cross arm front portion;
     a first cross arm side wall adjacent to the cross arm front portion;
     a second cross arm side wall opposing the first cross arm side wall, and
     a number of cross arm rear portions extending from the first and second cross arm side walls, the cross arm rear portions comprising a number of cross arm tab members dimensioned to engage the rear portion apertures;
   in which the cross arm front portion comprises a first tab member dimensioned to engage the first aperture portion of the post front aperture and a lock member positioned adjacent the first tab member and dimensioned to engage the second aperture portion of the post front aperture.

2. The system of claim 1, in which the cross arm front portion, first cross arm side wall, and second cross arm side wall of the cross arm are dimensioned to match the post front portion, the first post side wall, and the second post side wall of the vertical post.

3. The system of claim 1,
   in which the number of post rear portions comprises a first post rear portion extending from the first post side wall, the first post rear portion defining a first rear portion aperture; and
   in which the number of cross arm rear portions comprises a first cross arm rear portion extending from the first cross arm side wall, the first cross arm rear portion comprising a second tab member dimensioned to engage the first rear portion aperture.

4. The system of claim 3,
   in which the number of post rear portions comprises a second post rear portion extending from the second post side wall, the second post rear portion defining a second rear portion aperture; and
   in which the number of cross arm rear portions comprises a second cross arm rear portion extending from the second cross arm side wall, the second cross arm rear portion comprising a third tab member dimensioned to engage the second rear portion aperture.

5. The system of claim 4, in which the second tab member of the first cross arm rear portion comprises a first tip portion dimensioned to engage a surface of the first post rear portion, and
   in which the third tab member on the second cross arm rear portion comprise a second tip portion dimensioned to engage a surface of the second post rear portion.

6. The system of claim 4, in which the second and third tab members have a thickness approximately equal to the width of the first rear portion aperture and second rear portion aperture respectively.

7. The system of claim 1, in which the first aperture portion of the post front aperture is trapezoidal in shape, the trapezoidal shape comprising two parallel sides and two non-parallel sides, in which the non-parallel sides of the first portion of the post front aperture is dimensioned to engage the first tab member.

8. The system of claim 7, in which the second portion of the post front aperture is rectangular in shape, in which the second portion of the post front aperture is dimensioned to engage the lock member.

9. The system of claim 1, in which the system comprises a number of vertical post and horizontal cross arm pairs along the length of the post.

10. The system of claim 1, in which the post and cross arm are made of steel, metal, metal alloys, plastics, polymers, fiberglass, carbon fiber reinforced plastics, resins, or combinations thereof.

11. The system of claim 1, in which the post further comprises a number of returns to strengthen the post and prevent premature failure of harvester beater bars.

12. The system of claim 1, in which the post front portion, the first post side wall, and the second post side wall of the vertical post comprise a number of coinings to create an interference fit between the cross arm front portion, first cross arm side wall, and second cross arm side wall of the cross arm and the post front portion, the first post side wall, and the second post side wall of the vertical post.

13. The system of claim 1, in which the first tab member comprises a standoff distance between the underside of the first tab member and the cross arm front portion.

14. The system of claim 13, in which the standoff distance is approximately equal to the thickness of the post front portion o create an interference fit between the first tab member and the post front portion.

15. The system of claim 13, in which the standoff distance is less than the thickness of the post front portion to create an interference fit between the first tab member and the post front portion.

16. The system of claim 1, in which the lock member comprises an upending tip portion that is dimensioned to abut against the second aperture portion of the post front aperture in opposition to the first tab member.

17. The system of claim 1, in which the first tab member and the lock member are dimensioned with respect to the post front aperture of the vertical post to create an interference fit between the first tab member and the lock member, and the first and second aperture portions.

18. The system of claim 1, further comprising a number of wire slots defined in the cross arm to carry a number of trellis wires.

19. The system of claim 18, in which each of the wire slots comprises:
   a first carrying portion;
   a second carrying portion; and
   a flanged opening, the flanged opening comprising an upturned flange portion to create an opening for insertion of the trellis wires into the wire slots while preventing the trellis wires from sliding out of the wire slots.

* * * * *

UNITED STATES PATENT AND TRADEMARK OFFICE
CERTIFICATE OF CORRECTION

PATENT NO. : 8,813,421 B2  Page 1 of 1
APPLICATION NO. : 13/847977
DATED : August 26, 2014
INVENTOR(S) : George M. Schaeffer It is certified that error appears in the above-identified patent and that said Letters Patent is hereby corrected as shown below:

In the Claims,
Column 8, Line 6, Claim 14, change "o create" to-- "to create"

Signed and Sealed this
Twenty-second Day of September, 2015

Michelle K. Lee
*Director of the United States Patent and Trademark Office*